Patented May 5, 1953

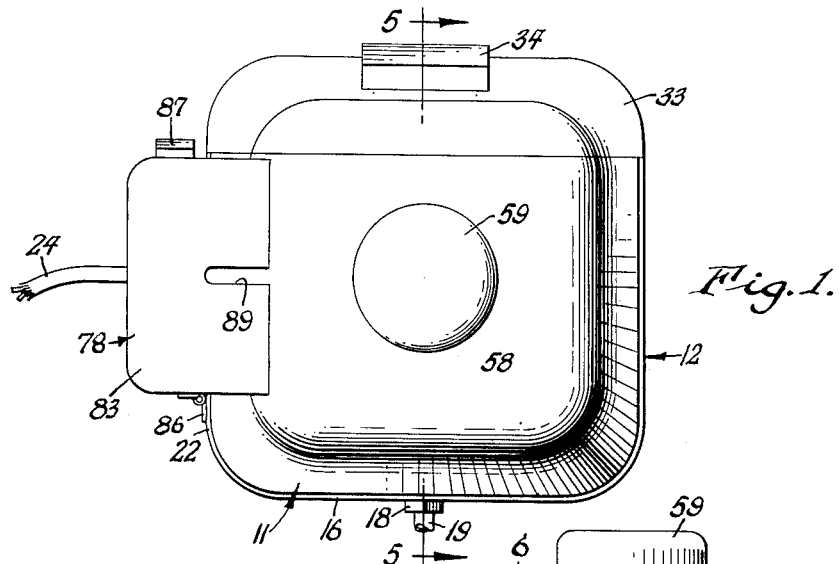
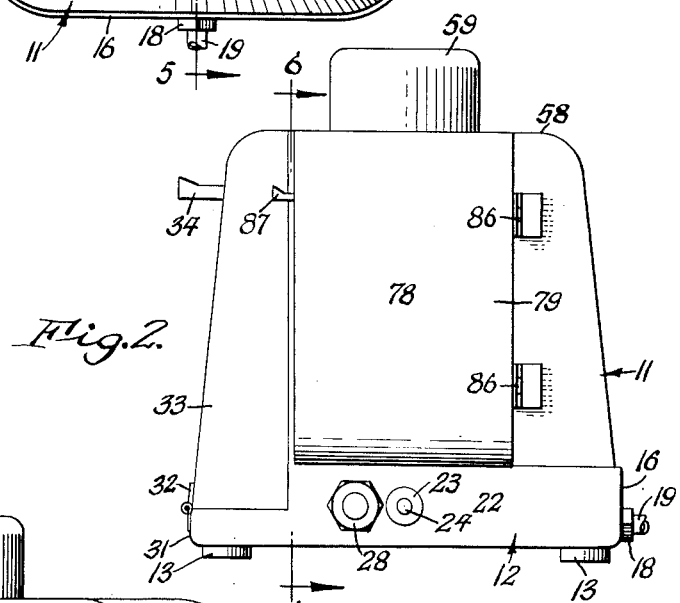
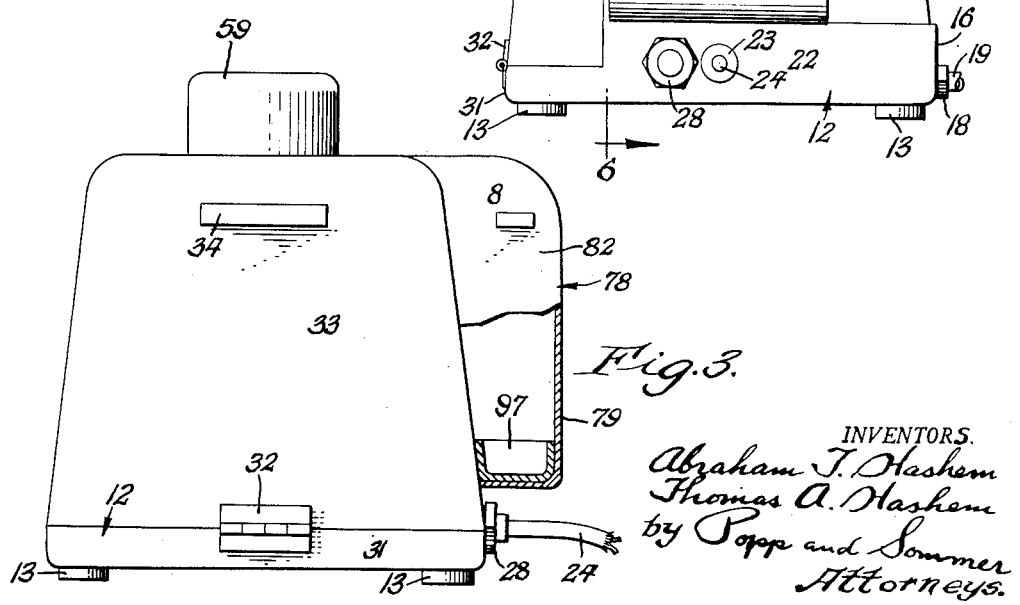

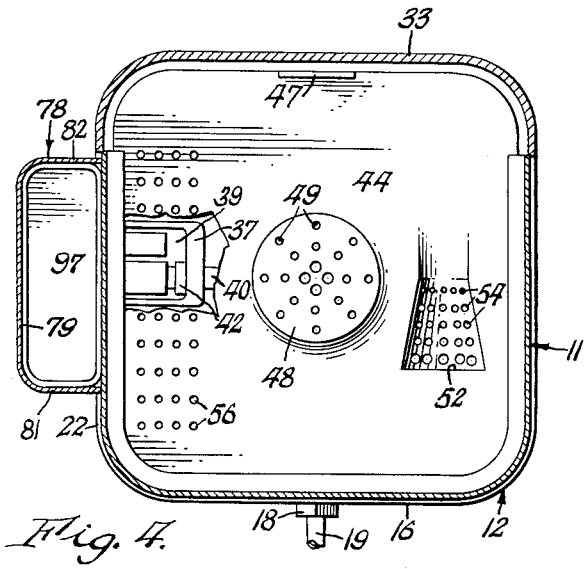
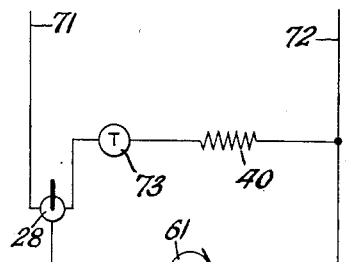
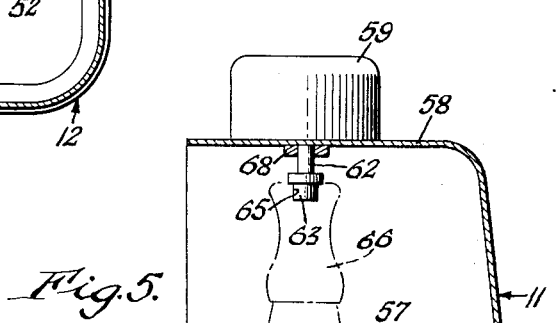
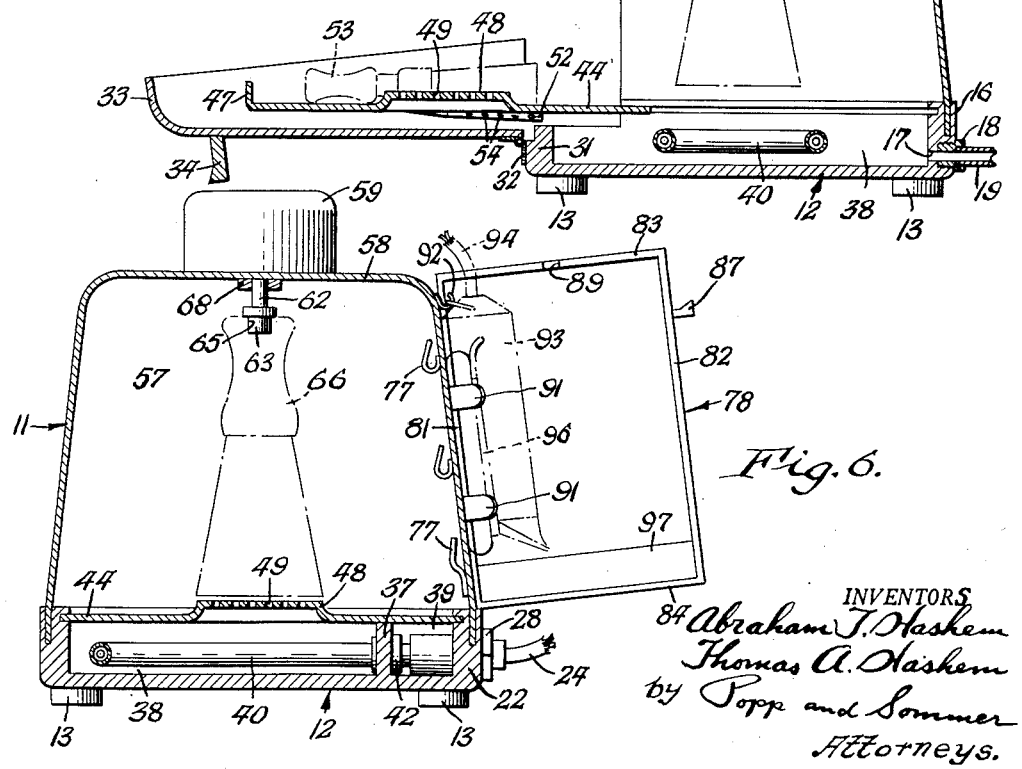

2,637,077

UNITED STATES PATENT OFFICE 2,637,077

STERILIZER

Abraham T. Hashem and Thomas A. Hashem, Cheektowaga, N. Y.

Application July 13, 1950, Serial No. 173,664

2 Claims. (Cl. 21—96)

This invention relates to sterilizers and is particularly concerned with improved cabinet type sterilizers designed for use by barbers, hair dressers, and the like.

It is an object of the present invention to provide a sterilizer of the type described which is attractive and neat in appearance and in which the tools and implements of the barber may be efficiently sterilized and prepared for re-use.

Another object of the invention is to provide a sterilizing cabinet which is compact and conveniently arranged to receive the tools and implements which it is desired to sterilize and from which the sterilized articles may be readily removed when their use is required.

A further object of the invention is to provide a sterilizer with a dual cabinet which permits sterilization of implements by alternative methods.

Still another object of the invention is to provide a sterilizer of simple, inexpensive construction, but which is reliable in operation and is inexpensive and easy to use and operate.

Other objects and advantages of the invention will be apparent from the following description of one embodiment thereof considered in connection with the accompanying drawings in which:

Fig. 1 is a top plan view of a sterilizer constructed in accordance with the present invention;

Fig. 2 is a side elevation of the sterilizer shown in Fig. 1;

Fig. 3 is a front elevation of the sterilizer shown in Figs. 1 and 2 with a portion thereof broken away to show the interior arrangement of the auxiliary sterilizing chamber;

Fig. 4 is a transverse sectional view of the sterilizer shown in Figs. 1–3, inclusive, showing the construction of the removable instrument tray and with a portion of the tray broken away to show certain details of the base construction;

Fig. 5 is a vertical sectional view on the line 5—5 of Fig. 1 with the sterilizing chamber door swung downwardly into open position and the removable instrument tray pulled out;

Fig. 6 is a vertical sectional view on the line 6—6 of Fig. 2 with the shell forming the auxiliary sterilizing chamber swung back to show the arrangement of the implements therein; and Fig. 7 is a schematic diagram of the electrical circuit used in the sterilizer shown in the preceding figures.

The sterilizer illustrated in the drawings comprises a casing 11 which is preferably substantially square in horizontal section with upwardly converging sides and rounded corners and edges. It may conveniently be formed of aluminum, stainless steel or enamelled sheet metal although other suitable materials may also be used. At its open lower end the casing 11 is carried by a shallow base or tank 12, which may also be constructed of metal or may be formed of porcelain, metal lined plastic, or other suitable materials and which has a horizontal section like that of the casing 11.

On its bottom, the base 12 is provided adjacent each corner thereof with a downwardly projecting foot 13. Through the rear wall 16 of the base 12 there is provided an opening 17, the outer portion of which is enlarged to receive a screw-threaded nipple 18 which carries a small tube 19. Through one side wall 22 of the tank 12 there is provided a hole adapted to receive an insulating bushing or grommet 23 through which an electrical cable or cord 24 may be led into the interior of the base. Mounted on the tank wall 22 in close proximity to the bushing 23 is a timer switch 28 which is connected to the electrical cable 24 interiorly of the tank 12.

On the exterior of the front wall 31 of the base or tank 12 there is provided a horizontally arranged hinge 32, the upper leaf of which is attached to the front side of the casing 11 which is detachable and forms a door 33. When the door 33 is in raised, vertical position it closes the casing 11; when swung down into open position it permits free and convenient access to the interior of said casing. The door 33 is preferably formed of the same material as the casing 11 and is provided with a handle or other grasping means 34 adjacent the top of its exterior.

A partition 37 preferably formed integrally with the base or tank 12 divides the interior of the base into a large steam generating chamber 38 and a smaller compartment 39 adjacent the side wall 22 which surrounds the inner end of the bushing or grommet 23. An electrical heating element 40 of conventional type is provided within the chamber 38, one end of said element passing through an insulating bushing 42 in the partition 37 into the compartment 39. The timer switch 28 and the electric cable 24 also project into the compartment 39 and suitable electrical connections between the cable, the timer switch and the heating element 40 are provided within the compartment.

An instrument tray 44, preferably made of aluminum or stainless steel, is mounted in the base 12 with the edges thereof slidably fitting into horizontal slots or grooves 46 formed along the side and rear walls of the base adjacent the top thereof. The front wall 31 of the base or tank 12 is reduced in height to permit the tray 44 to slide longitudinally into and out of the base. When the casing door 33 is swung downwardly into the position shown in Fig. 5, the tray 44 may be withdrawn from the sterilizer.

The instrument tray 44 is formed with an upturned flange 47 at its front edge by which it may be conveniently grasped for movement thereof and with a convex central portion 48 which is provided with a plurality of holes 49 and is preferably circular in shape. On one side of the raised portion 48 the tray 44 is provided with a depressed portion 52 which is so shaped as to receive a shaving or lather brush 53 of conventional design and size and prevent rolling thereof. A plurality of holes or perforations 54 are formed in the tray 44 within the depressed portion 52. Further, on the opposite side of the raised portion 48, the tray has formed therein a plurality of holes 56. The tray 44 thus serves as a permeable panel or partition between the steam generating chamber 38 and the steam sterilizing chamber 57 which is provided in the interior of the casing 11.

Mounted on the top 58 of the casing 11 is a motor housing 59 which is secured by suitable means (not shown). Within the housing 59 there is provided an electric motor 61 which is supplied with current through suitable connections (not shown) with the cord or cable 24 in the compartment 39 and is controlled by the timer switch 28. The shaft 62 of the motor 61 extends vertically downwardly into the steam sterilizing chamber 57 in the interior of the casing 11 and its lower end is provided with a detachable gripping device 63 which is adapted, as shown in Figs. 5 and 6, to be inserted in a recess 65 in the base of a hair or neck brush 66 such as is customarily used by barbers. Surrounding the shaft 62 and also extending downwardly into the casing 11 is a bearing bushing 68.

In Fig. 7 there is shown a schematic diagram of the electrical circuit used with the sterilizer of the present invention. The leads 71 and 72 which represent the electrical power cord or cable 24 are connected with a suitable source of electrical current (not shown), the lead 71 being connected at its other end to the timer switch 28. The latter controls the flow of electrical current in parallel circuits through the motor 61 and the resistance heating element 40, respectively, between the leads 71 and 72. Interposed between the timer switch 28 and the heating element 40 in the latter circuit there is provided a thermostatic regulator 73 for a purpose to be hereinafter described.

The operation of a sterilizer embodying the present invention, as thus far described, is substantially automatic. When it is desired to carry out sterilization of tools or implements which have been used on a customer, the barber opens the door 33 of the sterilizer and pulls out the instrument shelf or tray 44. A measured quantity of water is then poured into chamber 38 in the base or tank 12, the lather brush 53 may be placed in the depression 52, and the comb and shears may be suspended from the clips or hooks 77 which are preferably attached to the side wall of the casing 11 opposite the brush 53. A neck brush 66 may then be suspended from the motor shaft 62 by the gripping device 63. The tray is then returned to position inside the sterilizer and the door 33 is closed.

Upon actuation of the timer switch 28 electrical current is first supplied to the electrical heating element 40 to heat the water which has been placed in the steam generating chamber 38. When the water reaches boiling temperature the thermostatic regulator 73 is actuated to reduce the current flowing through the heating element 40 so that the water is prevented from boiling but is kept at such a temperature that steam will be vigorously evolved.

Steam formed by the boiling water in the chamber 38 passes into the sterilizing chamber 57 through the perforations 49 in the convex portion 48 of the tray 44 by which it is directed onto the brush 66. The latter, which is suspended by its handle over the perforations, is thoroughly sterilized by the steam which is able to penetrate into the brush. At the same time steam passes through the perforations 54 in the depressed portion 52 and thoroughly sterilizes the lather brush 53 which is located therein. The shears and comb which are held by the clips 77 are also subjected to steam which passes through the holes 56 in the tray 44 on the side of the tray opposite to the depressed portion 52 and are thus sterilized. If desired, other tools or instruments may be laid on the tray 44 or hung on suitable means in the chamber 57 for sterilization. The generation of steam continues for the desired period of time which is determined by the timer switch 28.

At the conclusion of the sterilization period the switch further operates automatically to open the circuit through the heating element 40 and to close the circuit through the motor 61. The rotation of the motor shaft 62 which results causes rotation of the neck brush 66 with the result that moisture is spun out of the brush and it is dried ready for re-use. At this time any water which may remain in the chamber 38 may be drawn off through the opening 17, nipple 18 and tube 19. Drainage is prevented or permitted as desired, by a valve or stop-cock (not shown) on the tube 19.

The time required for the steam sterilization and brush drying cycle described above may be varied as desired or required by the size of the sterilizer and the amount of water used. The timer switch 28 is adjusted to operate automatically after initial actuation to generate steam by heating the water, to shut off the sterilizer and start the motor and finally to stop the motor at appropriate times.

Steam sterilization of certain of the instruments and tools used by barbers is undesirable because of the deleterious effect of moisture thereon or because of their being adversely affected by heat. Instruments of this type such as razors, clippers, and the like should, however, be sterilized. Accordingly, there has been provided on the exterior of the casing 11 an auxiliary sterilizing chamber. This auxiliary chamber is preferably located on the exterior of one side wall of the casing 11 and is formed by the shell 78. The shell 78 is substantially rectangular in vertical cross section and comprises, as shown best in Figs. 3 and 6, a vertical panel 79 which has extending outwardly therefrom around its edges walls 81, 82, 83, and 84, the free edges of which fit closely against the outer face of the adjacent side wall of the casing 11.

The shell 78 is pivotally mounted on the casing 11 by a pair of hinges 86, the leaves of which are attached to the casing and to the wall 81 of the shell. On its opposite wall 82 the shell 78 is provided with a finger grip 87 by which it may be conveniently swung on the hinges 86 to open and closed positions. It will be noted that the upper, substantially horizontal wall 83 extends inwardly toward the center of the casing 11 so as to make a smooth joint with the top 58 of the casing and is provided with a slot 89 therethrough providing communication from outside with the interior of the auxiliary chamber. A plurality of clips 91 and a hook 92 are attached by suitable means, such as welding, to the side wall of the casing 11 within the auxiliary sterilizing chamber. The hook 92 is adapted to support a clipper or dry shaver 93, the electrical cord 94 for which may pass through the slot 89 to the interior of the auxiliary chamber while the clips 91 are adapted to hold one or more straight razors 96 of conventional type.

In the bottom of the shell 78 there is mounted a dish or reservoir 97 which is adapted to hold a liquid and preferably somewhat volatile disinfectant such as formaldehyde solution or other similar fluid. When the shell 78 is swung into the position shown in Figs. 1-4, inclusive, the fumes from the disinfectant or sterilizing fluid in the dish 97 substantially fill the auxiliary sterilizing chamber and effectively sterilize the tools or instruments suspended therein. The instruments may be easily removed, however, by merely swinging back the shell 78 and removing the instruments from the supporting clips or hooks. The slight warming of the dish 97 which results from its proximity to the casing 11 will assist the production of disinfecting or sterilizing vapor from the fluid therein.

It will be seen from the foregoing description that the present invention provides a compact, convenient, and easily operated sterilizer which has dual sterilizing chambers and thus permits the sterilization with steam of tools and instruments which are not harmed thereby, while simultaneously instruments which would be rusted or deteriorated by steam may be sterilized by disinfectant fumes. The invention also provides a sterilizer of neat and attractive appearance in which the tools and instruments which have been sterilized may be kept until required for use.

An important feature of the invention is the provision of brush drying or conditioning means in the steam sterilizing chamber 57 by which the hair or neck brush is sterilized with steam and is then spun dry by rotation around its longitudinal axis. Such rotation not only throws out the moisture which has collected in the brush, but also frees the brush of accumulated fragments of hair.

While the drawings illustrate only one embodiment of the present invention, it will be understood that many changes and modifications in the construction may be made without departing from the spirit of the invention and that sterilizers embodying the principles of the invention may be made in different shapes, sizes, and arrangements.

We claim:

1. In a sterilizer of the character described having a base containing a steam generating chamber, electrical heating means in said chamber, and a casing above said base and supported thereby containing a steam sterilizing chamber, the combination therewith of means for sterilizing and drying a brush comprising a shaft extending into said sterilizing chamber and carrying means therein adapted to suspend said brush during sterilization thereof, a motor mounted on the exterior of said casing adapted to rotate said shaft and thereby to rotate said brush about its longitudinal axis, and a tray between and adapted to separate said chambers, said tray being slidably carried by said base and having a perforated upwardly projecting portion and a perforated downwardly projecting portion, said perforated upwardly projecting portion being adapted, when said tray is in position to separate said chambers, to direct steam from said generating chamber onto said brush.

2. In a sterilizer of the character described, a base containing a steam generating chamber, a casing above said base containing a steam sterilizing chamber, said casing being formed in two parts, one of said parts being rigidly supported by said base and the other of said parts being pivotally supported by said base, means for sterilizing and drying a brush comprising a shaft extending vertically through said casing into said sterilizing chamber adapted to suspend said brush in said sterilizing chamber and operating means outside said casing adapted to rotate said shaft and thereby to rotate said brush about its longitudinal axis, and a tray slidably carried by said base adapted to occupy a position separating said chambers and having means adapted, when said tray is in such position, to direct steam from said generating chamber onto said brush.

ABRAHAM T. HASHEM.
THOMAS A. HASHEM.

References Cited in the file of this patent

UNITED STATES PATENTS

| Number | Name | Date |
|---|---|---|
| 782,303 | Winchel et al. | Feb. 14, 1905 |
| 1,842,204 | Roberts | Jan. 19, 1932 |
| 2,130,709 | Cann | Dec. 28, 1937 |
| 2,239,741 | Schroder | Apr. 29, 1941 |